(12) United States Patent
Weyhrauch et al.

(10) Patent No.: US 7,462,996 B2
(45) Date of Patent: Dec. 9, 2008

(54) METHOD OF OPERATING A LAMP WITH A POWER CONTROLLER HAVING CURRENT LIMITED RMS REGULATED OUTPUT

(75) Inventors: Ernest C. Weyhrauch, Richmond, KY (US); Matthew B. Ballenger, Lexington, KY (US); George B. Kendrick, Lexington, KY (US); Brent J. Eastwood, Lexington, KY (US)

(73) Assignee: Osram Sylvania Inc., Danvers, MA (US)

( * ) Notice: Subject to any disclaimer, the term of this patent is extended or adjusted under 35 U.S.C. 154(b) by 164 days.

(21) Appl. No.: 11/541,809

(22) Filed: Oct. 2, 2006

(65) Prior Publication Data

US 2008/0106213 A1 May 8, 2008

(51) Int. Cl.
*H05B 37/02* (2006.01)

(52) U.S. Cl. ............... 315/308; 315/307; 315/291; 315/DIG. 4

(58) Field of Classification Search ............. 315/209 R, 315/224, 225, 209, 360, 362, 246, 200 R, 315/78, 244, 151, 302, 70, 199, 295, 294, 315/82, 119, 127, 247, 324, 203, 312, 219; 361/95, 91.1, 93.1, 79, 56, 115; 323/207, 323/222, 259; 318/800–802
See application file for complete search history.

(56) References Cited

U.S. PATENT DOCUMENTS

| | | | |
|---|---|---|---|
| 2,012,825 A | 8/1935 | Millner et al. ............. 75/17 |
| 3,275,922 A | 9/1966 | Meyer et al. ............. 321/15 |
| 3,609,402 A | 9/1971 | Ferro ................. 307/252 M |
| 3,869,631 A | 3/1975 | Anderson et al. ........... 313/217 |
| 4,224,563 A | 9/1980 | Hardy ................. 323/225 |
| 4,331,914 A | 5/1982 | Huber ................. 323/324 |
| 4,500,813 A | 2/1985 | Weedall ................. 315/276 |
| 4,547,704 A | 10/1985 | Brinn et al. ............. 315/71 |
| 4,645,982 A | 2/1987 | Takayanagi ............. 315/307 |
| 4,922,155 A | 5/1990 | Morris et al. ............. 315/205 |
| 4,988,921 A | 1/1991 | Ratner et al. ............. 315/159 |
| 5,519,311 A | 5/1996 | Widmayer ............. 232/319 |
| 6,208,090 B1 | 3/2001 | Skilskyj et al. ............. 315/360 |
| 6,285,119 B1 | 9/2001 | Sundhar ............. 313/318.04 |
| 6,445,133 B1 | 9/2002 | Lin et al. ............. 315/57 |
| 6,600,255 B1 | 7/2003 | Kai et al. ............. 313/271 |
| 6,727,665 B2 | 4/2004 | Yao ................. 315/247 |
| 2002/0047608 A1 | 4/2002 | Takahashi et al. ........... 315/224 |
| 2004/0085049 A1 | 5/2004 | Orozco ............. 323/235 |
| 2005/0110437 A1* | 5/2005 | Ballenger et al. ........... 315/307 |
| 2005/0122086 A1* | 6/2005 | Ballenger et al. ........... 323/237 |
| 2005/0275354 A1 | 12/2005 | Hausman, Jr. et al. ....... 315/291 |

* cited by examiner

*Primary Examiner*—Tuyet Vo
*Assistant Examiner*—Jae K Kim
(74) *Attorney, Agent, or Firm*—Carlo Bessone

(57) ABSTRACT

A method for converting a line voltage to an RMS load voltage in a lamp includes providing a control circuit which includes a switch and a microcontroller that operates the switch to establish an RMS load voltage for the lamp. The load voltage of the lamp is sensed and the sensed load voltage is compared in the microcontroller to a reference RMS voltage. Operation of the switch is adjusted in response to the comparison so that the RMS load voltage is substantially constant at the reference RMS voltage over a first operating range of the line voltage and so that the RMS load voltage decreases with decreasing line voltage at non-zero line voltages less than the first operating range.

4 Claims, 8 Drawing Sheets

FIG. 8
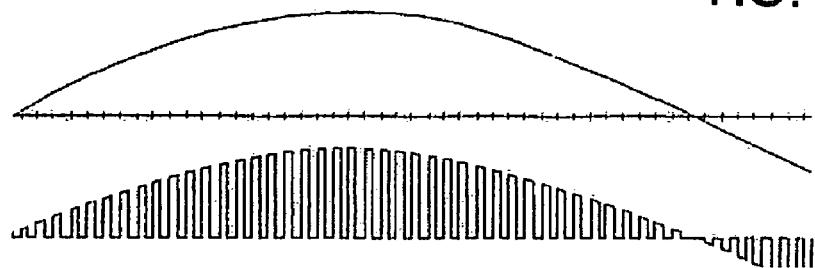
Incoming voltage waveform (top) and Pulse Width Modulated voltage waveform (bottom)
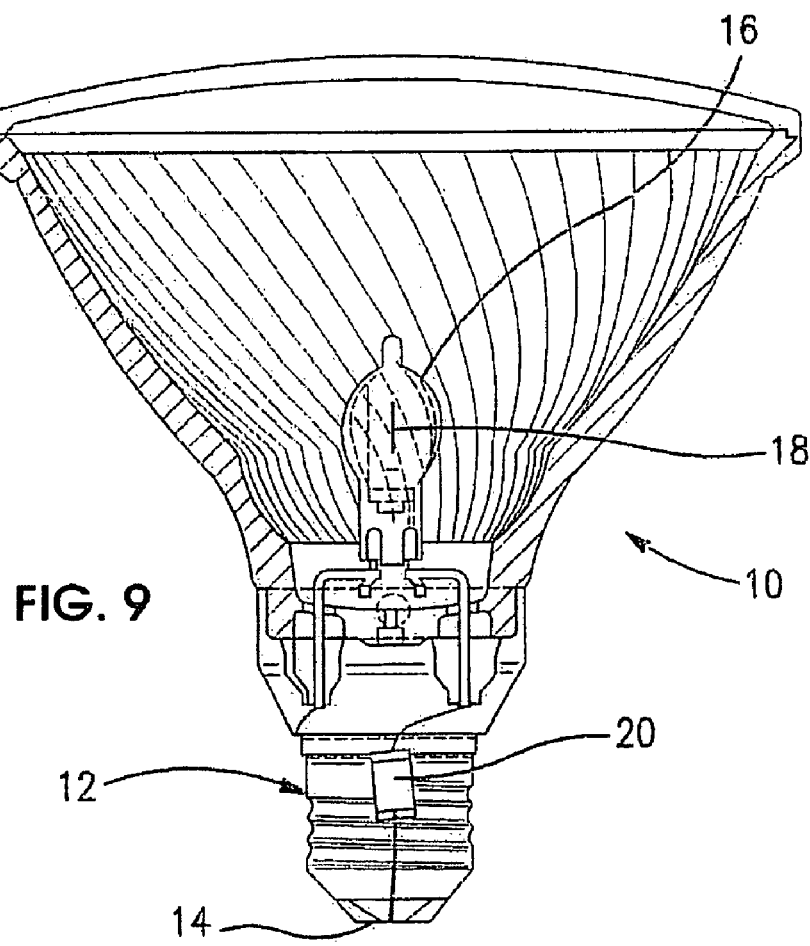
FIG. 9

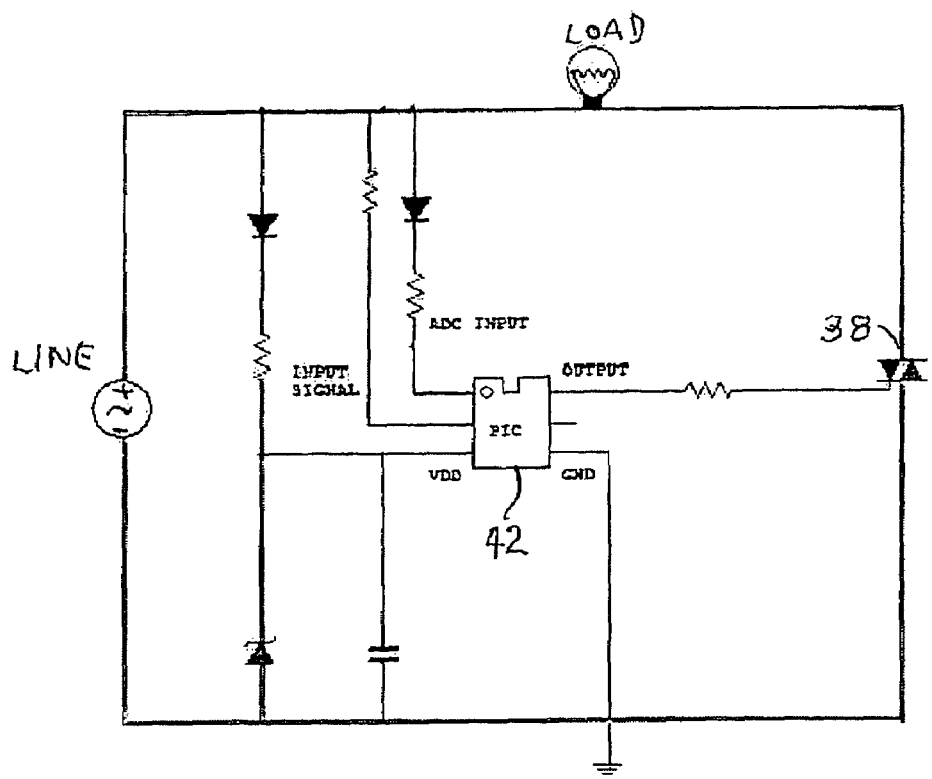
FIG. 13a
FIG. 13b
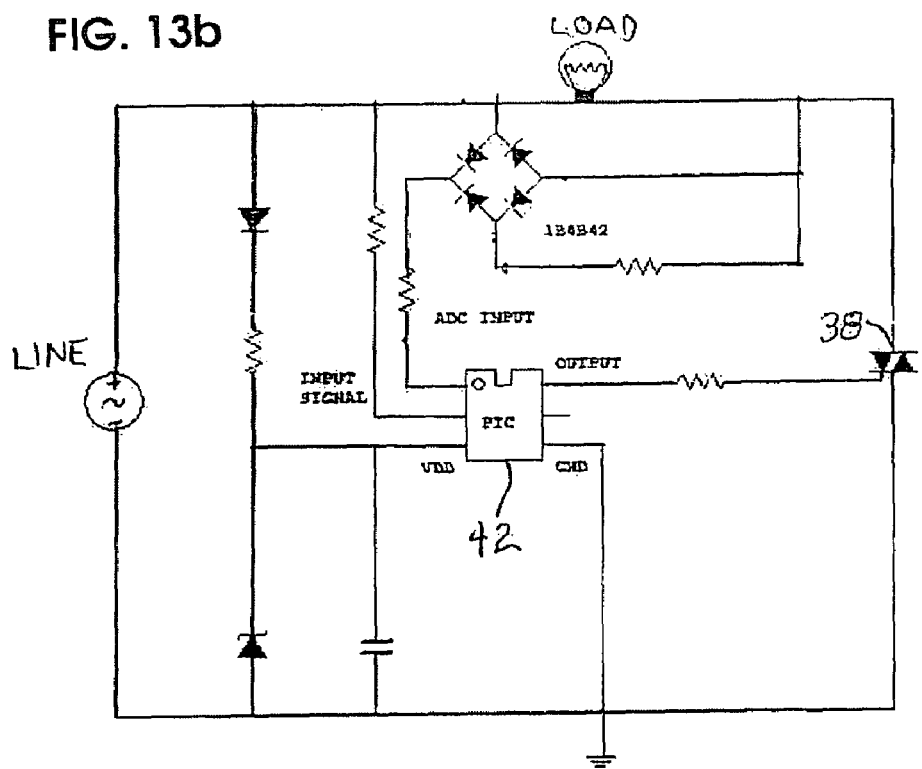

METHOD OF OPERATING A LAMP WITH A POWER CONTROLLER HAVING CURRENT LIMITED RMS REGULATED OUTPUT

BACKGROUND OF THE INVENTION

The present invention is directed to a method of converting a line voltage to an RMS load voltage in a lamp.

Some loads, such as lamps, operate at a voltage lower than a line (or mains) voltage of, for example, 120V or 220V, and for such loads a voltage converter (or power controller) that converts line voltage to a lower operating voltage must be provided.

The power supplied to the load may be controlled with a phase-control clipping circuit, such as shown FIG. 1, that includes a capacitor 22, a diac 24, a triac 26 that is triggered by the diac 24, and resistor 28. The resistor 28 may be a potentiometer that sets a resistance in the circuit to control the phase at which the triac 26 fires. In operation, a clipping circuit such as shown in FIG. 1 has two states. In the first state the diac 24 and triac 26 operate in the cutoff region where virtually no current flows. Since the diac and triac function as open circuits in this state, the result is an RC series network such as illustrated in FIG. 2. Due to the nature of such an RC series network, the voltage across the capacitor 22 leads the line voltage by a phase angle that is determined by the resistance and capacitance in the RC series network. The voltage across the diac 24 is analogous to the voltage drop across the capacitor 22 and thus the diac will fire once breakover voltage $V_{BO}$ is achieved across the capacitor. The triac 26 fires when the diac 24 fires. Once the diac has triggered the triac, the triac will continue to operate in saturation until the diac voltage approaches zero. That is, the triac will continue to conduct until the line voltage nears zero crossing. The virtual short circuit provided by the triac becomes the second state of the clipping circuit as illustrated in FIG. 3. Triggering of the triac 26 in the clipping circuit is forward phase-controlled by the RC series network and the leading portion of the line voltage waveform is clipped until triggering occurs as illustrated in FIG. 4. The RMS load voltage is determined by the resistance and capacitance values in the clipping circuit since the phase at which the clipping occurs is determined by the RC series network and since the RMS voltage depends on how much energy is removed by the clipping.

With reference to FIG. 5, clipping is characterized by a conduction angle α and a delay angle θ. The conduction angle is the phase between the point on the load voltage/current waveforms where the triac begins conducting and the point on the load voltage/current waveform where the triac stops conducting. Conversely, the delay angle is the phase delay between the leading line voltage zero crossing and the point where the triac begins conducting. FIG. 5 shows the conduction angle convention for forward phase clipping, FIG. 6 shows the conduction angle convention for reverse phase clipping (the conduction angle α immediately follows a polarity change of the load voltage), and FIG. 7 shows the conduction angle convention for forward/reverse hybrid phase clipping (the conduction angles $α_1$ and $α_2$ immediately follow and immediately precede a polarity change.)

Instead of phase-clipping, a suitable RMS load voltage may be established with a voltage conversion circuit that uses pulse width modulation to reduce the energy supplied to the load. Pulse width modulation (PWM) may be achieved with a microcontroller that generates signals (e.g., pulses) whose frequency and duration establish a duty cycle for a transistor switch that is appropriate for the desired RMS load voltage. The signals are applied to the gate of the transistor switch so that the voltage applied to the light emitting element is switched ON and OFF at much greater speed than the line voltage frequency (typically 50-60 Hz). The frequency of the signals is desirably higher than the audible range (i.e., above about 20 kHz). FIG. 8 shows an example of an incoming voltage waveform and a pulse width modulated voltage waveform (the frequency of the PWM being reduced to illustrate the modulation). Phase clipping and PWM are also explained in the U.S. applications mentioned below and incorporated by reference.

Line voltage may vary from location to location or at a particular location up to about 10-15% and may vary more than this in unusual situations. Such variations can cause a harmful variation in RMS load voltage in the load (e.g., a lamp). For example, if line voltage were above the standard for which the voltage conversion circuit was designed, the triac 26 (FIG. 1) may trigger early thereby increasing RMS load voltage. In a halogen incandescent lamp, it is desirable to have an RMS load voltage that is nearly constant.

Further, if the line voltage decreases significantly, the voltage conversion circuit will change the phase conduction angle or switch duty cycle to attempt to maintain the desired RMS load voltage and such changes will increase the current drawn by the load. Increasing load current can overload a system and cause system failure.

For example, a building equipped with a 100 ampere/120V lighting circuit may be loaded up to about 80% of the maximum so that it would be expected that an 80 ampere load would be placed on the circuit. The circuit can power 50 W/120V lamps that each includes voltage reduction circuitry to provide 50V to the lamp filament. At rated voltage, a 50 W/120V lamp draws 0.417 amperes so this circuit could handle about 190 such lamps (80 amps/0.417 amps per lamp=about 190 lamps). If the input voltage drops from the normal 120V to 90V (a 25% drop), the conduction angle or duty cycle would increase to sustain 50 W/50V at the filament. However, in order to supply 50 W with only 90V, each lamp must draw 0.556 amperes, increasing the total draw on the circuit to 106 amperes, probably causing a circuit breaker to trip. Thus, the performance of conventional voltage reduction circuitry in abnormal situations requires improvement.

When the power controller is used in a voltage converter of a lamp, the voltage converter may be provided in a fixture to which the lamp is connected or within the lamp itself. U.S. Pat. No. 3,869,631 is an example of the latter, in which a diode is provided in the lamp base for clipping the line voltage to reduce RMS load voltage at the light emitting element. U.S. Pat. No. 6,445,133 is another example of the latter, in which transformer circuits are provided in the lamp base for reducing the load voltage at the light emitting element.

SUMMARY OF THE INVENTION

An object of the present invention is to provide a novel power controller that converts a line voltage to an RMS load voltage and that limits load current by using a microcontroller to adjust the voltage conversion in response to variations in line voltage magnitude.

A further object is to provide a novel voltage conversion circuit that converts a line voltage to an RMS load voltage for a lamp, where the circuit includes a switch and a microcontroller that operates the switch to define the RMS load voltage, and where the microcontroller senses a load voltage of the lamp, compares the sensed load voltage to a reference RMS voltage, and operates the switch in response to the comparison so that the RMS load voltage is substantially constant at the reference RMS voltage over an operating range of the line voltage and so that the RMS load voltage decreases with decreasing line voltage at line voltages less than the operating range, thereby limiting the load current. The operating range of the line voltage may be defined to have a minimum that is a non-zero line voltage at which a load current is a predetermined maximum. The voltage conversion circuit may be a phase clipping circuit or a PWM circuit.

A yet further object is to provide a novel lamp with this power controller within a base of the lamp.

BRIEF DESCRIPTION OF THE DRAWINGS

FIG. 8 is a schematic illustration of pulse width modulation of an incoming waveform.

FIG. 9 is a partial cross section of an embodiment of a lamp of the present invention.

FIGS. 13a and 13b are circuit diagrams of further embodiments of the voltage conversion circuit of the present invention.

DESCRIPTION OF PREFERRED EMBODIMENTS

Figure 1:
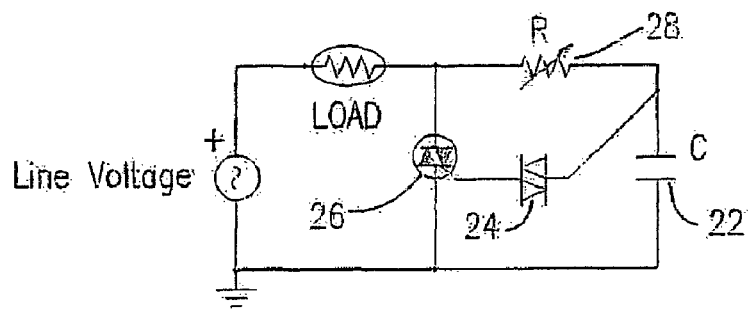
FIG. 1 is a schematic circuit diagram of a phase-controlled clipping circuit of the prior art.
Figure 2:
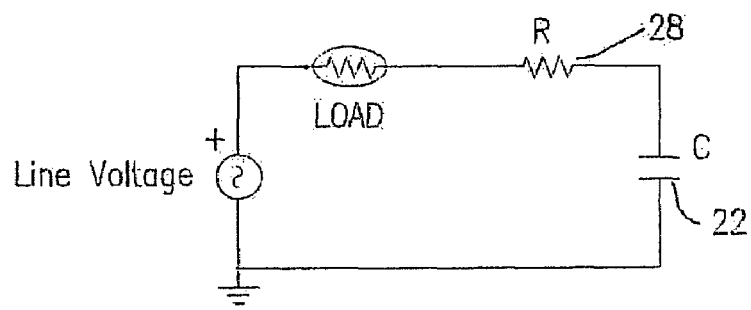
FIG. 2 is a schematic circuit diagram of the circuit of FIG. 1 showing an effective state in which the triac is not yet triggered.
Figure 3:
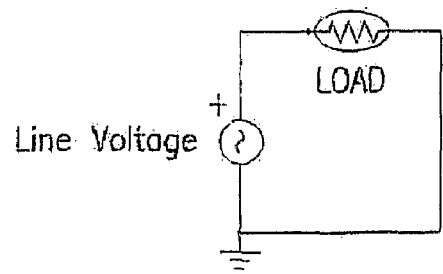
FIG. 3 is a schematic circuit diagram of the circuit of FIG. 1 showing an effective state in which the triac has been triggered.
Figure 4:
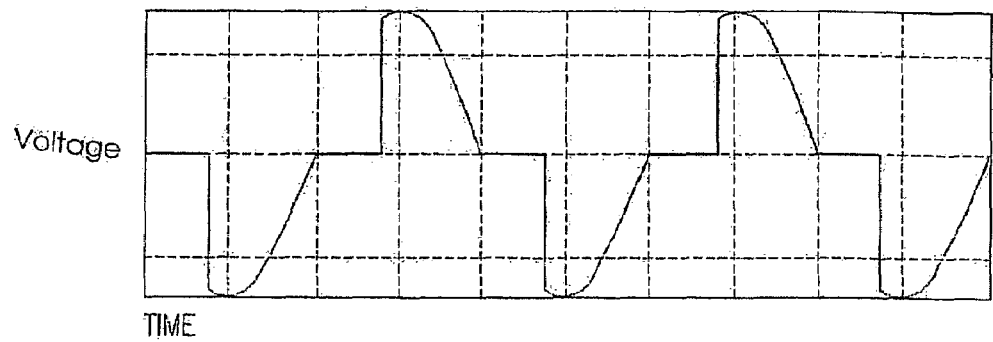
FIG. 4 is a graph illustrating voltage clipping in the circuit of FIG. 1.
Figure 5:
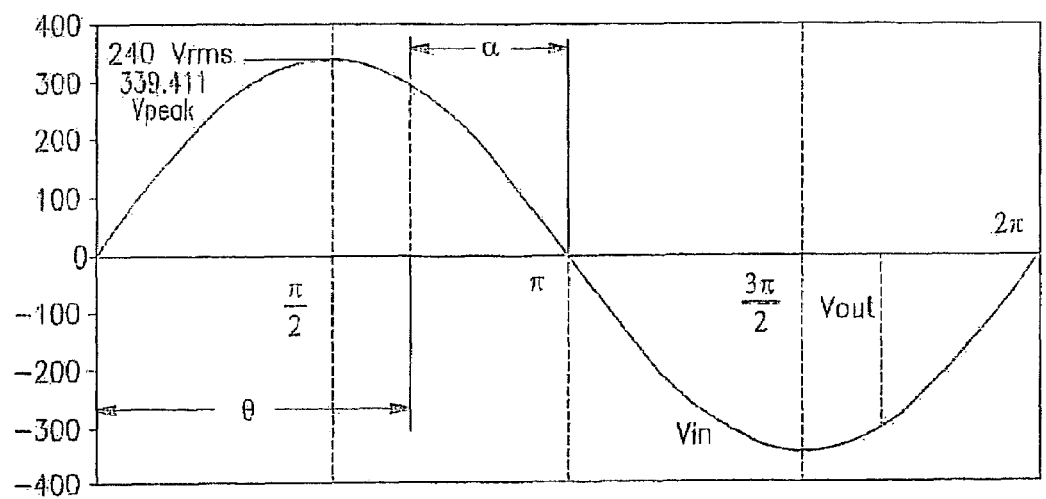
FIG. 5 is a graph showing the conduction angle convention for forward phase clipping.
Figure 6:
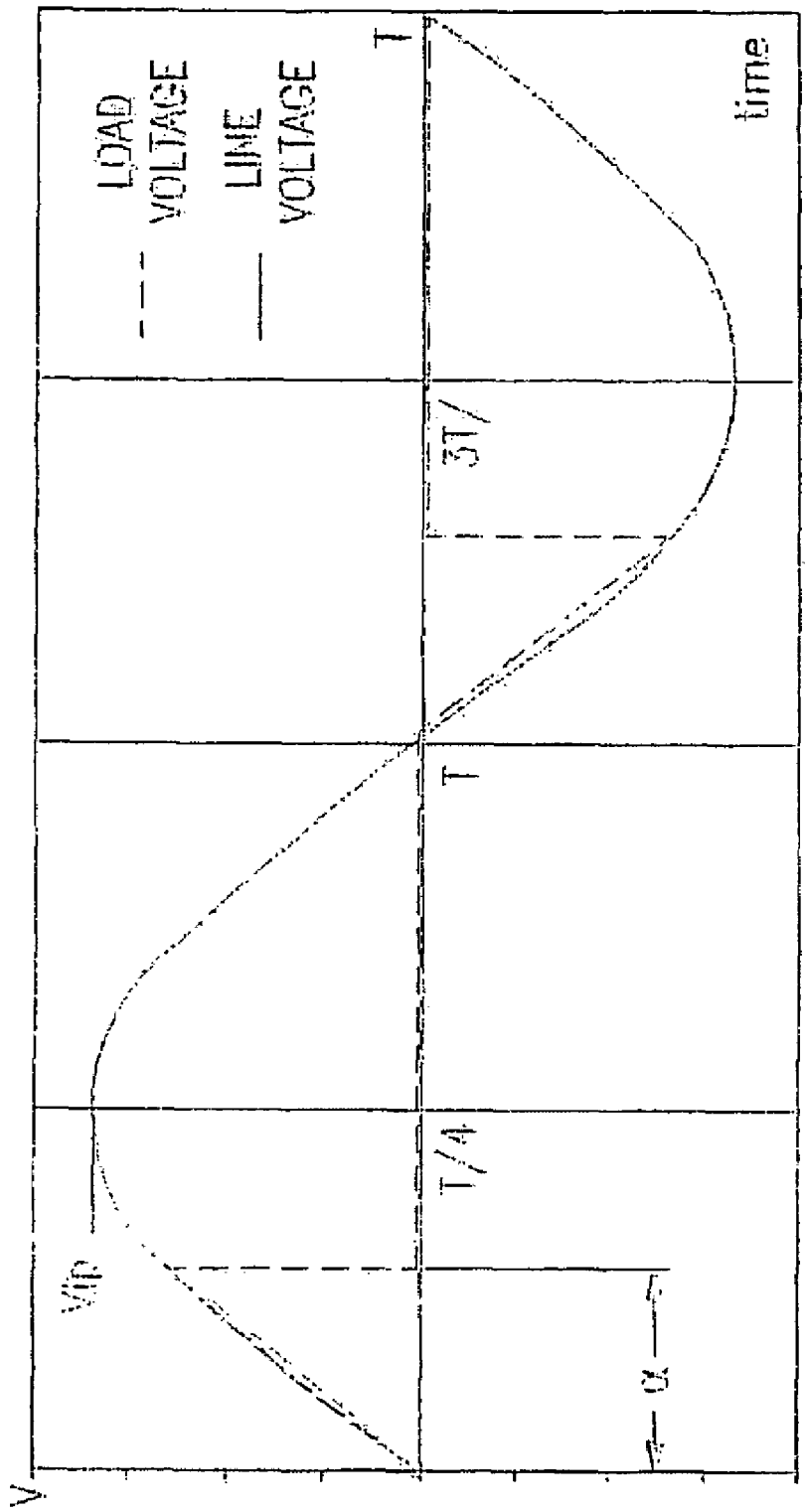
FIG. 6 is a graph showing the conduction angle convention for reverse phase clipping.
Figure 7:
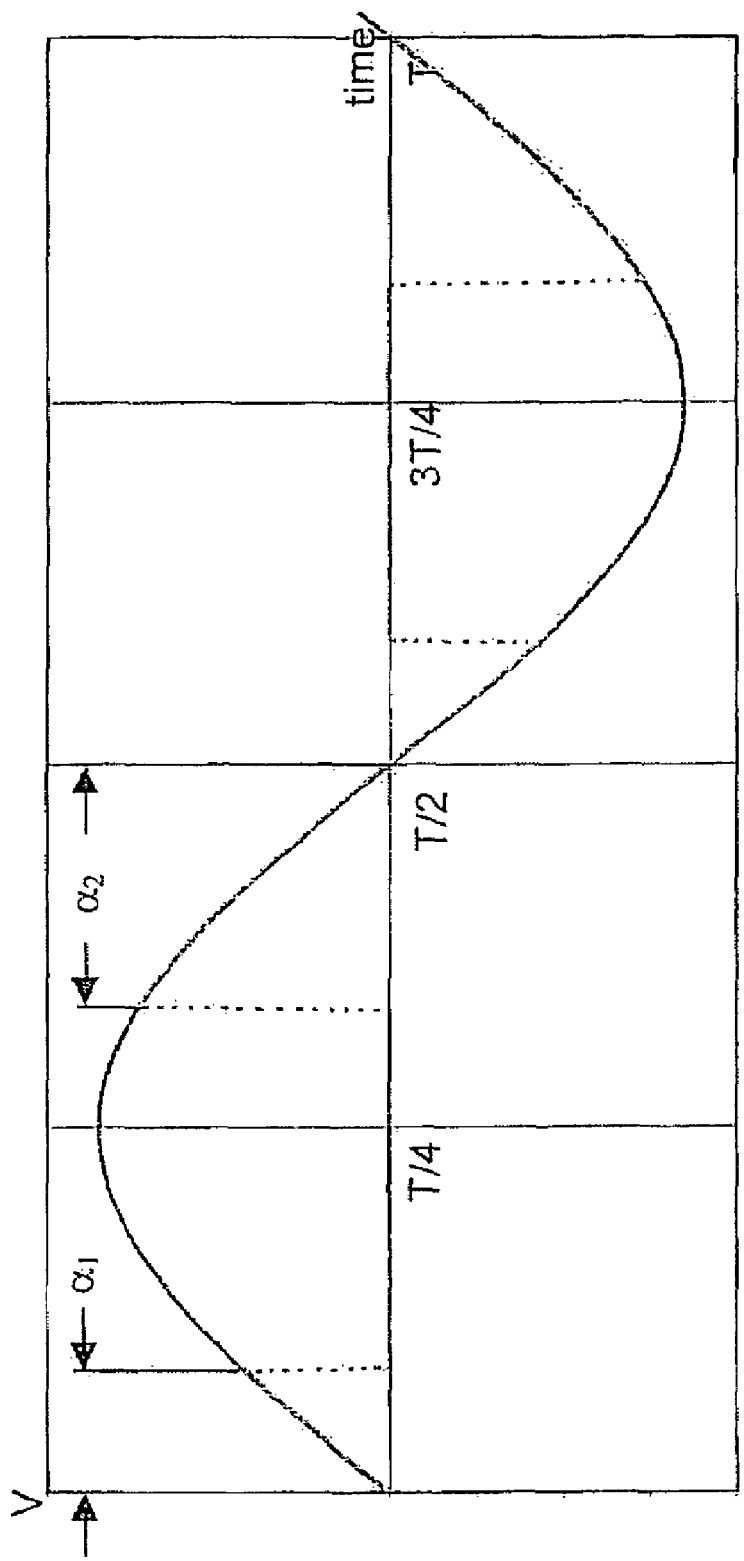
FIG. 7 is a graph showing the conduction angle convention for forward/reverse hybrid phase clipping.

With reference to FIG. 9, a lamp 10 includes a base 12 with a lamp terminal 14 that is adapted to be connected to line (mains) voltage, a light-transmitting envelope 16 attached to the base 12 and housing a light emitting element 18 (an incandescent filament in the embodiment of FIG. 9), and a voltage conversion circuit 20 for converting a line voltage at the lamp terminal 14 to a lower operating voltage. The voltage conversion circuit 20 may be entirely within the base 12 and connected between the lamp terminal 14 and the light emitting element 18 (that is, the voltage conversion circuit 20 may be entirely within the part of the lamp that is arranged and adapted to fit into a lamp socket, such as shown in FIG. 9). The voltage conversion circuit 20 may be an integrated circuit in a suitable package as shown schematically in FIG. 9.

While FIG. 9 shows the voltage conversion circuit 20 in a parabolic aluminized reflector (PAR) halogen lamp, the voltage conversion circuit 20 may be used in any incandescent lamp when placed in series between the light emitting element (e.g., filament) and a connection (e.g., lamp terminal) to a line voltage. Further, the voltage conversion circuit described and claimed herein finds application other than in lamps and is not limited to lamps. It may also be used more generally where resistive or inductive loads (e.g., motor control) are present to convert an unregulated AC line or mains voltage at a particular frequency or in a particular frequency range to a regulated RMS load voltage of specified value.

Operation of the voltage conversion circuit 20 is set so that the load current is limited when the line voltage drops below a normal operating range. For example, consider again the example above in which a 50 W/120V lamp includes voltage reduction circuitry so that the lamp filament receives 50V (drawing 0.417 amperes). In a phase clipping circuit, the conduction angle necessary to drop the line voltage from 120V to 50V is about 57°. Assume that the lamp is part of a lighting circuit that is designed to accept up to a 25% increase in current, so that the maximum load current for the lamp will be 0.521 amperes (1.25×0.417). At 50 W, this current corresponds to an operating voltage of 96V. The conduction angle needed to sustain 50V at the filament with 96V is about 68°. Thus, if the maximum conduction angle of the phase clipping circuit is set to 68°, then the load current will not exceed the predetermined maximum. A similar result may be achieved for PWM by determining a maximum duty cycle for the predetermined maximum load current.

The maximum conduction angle (for phase clipping) or maximum duty cycle (for PWM) is predetermined based on the maximum load current and is established (e.g., programmed) in the voltage conversion circuit 20 in the present invention.

The normal operating range of the line voltage now may be defined as having a minimum at which the load current is a predetermined maximum (in the example above, the minimum of the normal operation range would be 96V.) The voltage conversion circuit may operate normally (phase clipping or PWM) above this minimum so that the RMS load voltage is constant, or nearly so, from the minimum up to a maximum of about 120% of the normal line voltage (e.g., 144V for a 120V line voltage supply). The maximum amount is not significant to the present invention and, indeed, need not be set or established at all for the purposes of the present invention.

Figure 10:
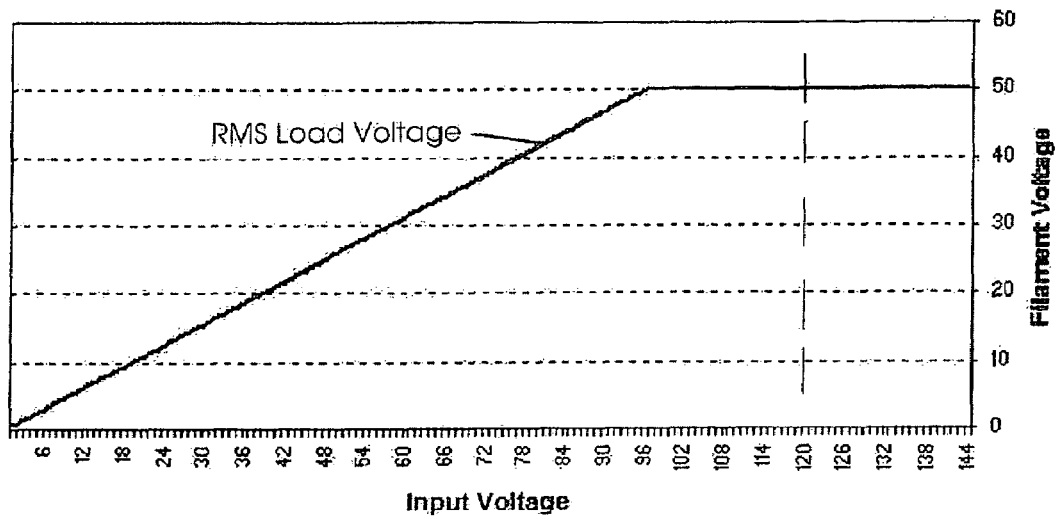
FIG. 10 is a graph depicting an example of RMS load voltage at a lamp filament, where the voltage conversion circuit includes the current limiting of the present invention.
Figure 11:
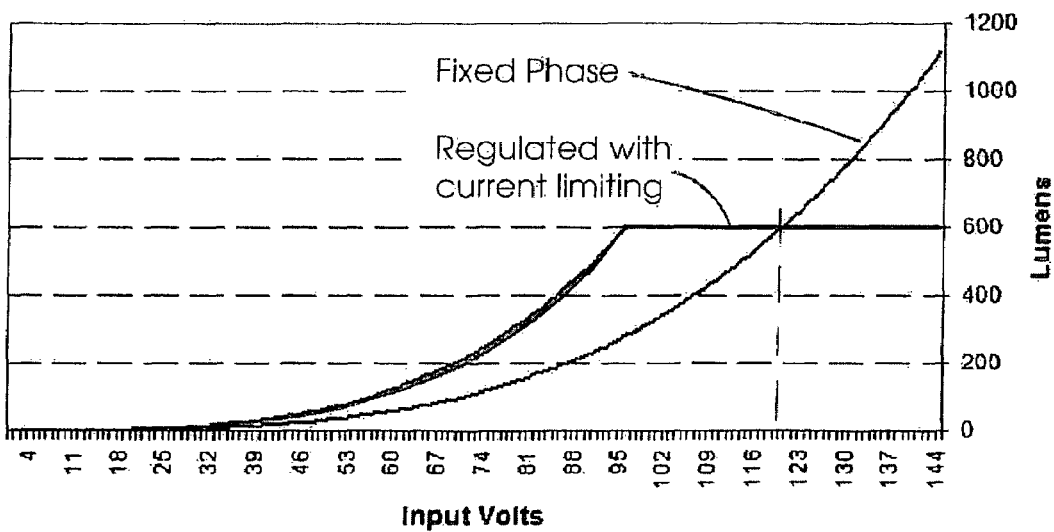
FIG. 11 is a graph depicting light output from the lamp having the RMS load voltage shown in FIG. 10.

This current limiting achieved by the present invention is illustrated, by way of example, in FIGS. 10 and 11 that are graphs of filament (RMS load) voltage vs. input (line) voltage and lamp output (lumens) vs. input voltage. As is apparent, the RMS load voltage is substantially constant over a normal operating range (96 to 144V or more) of the line voltage so that the lamp output is also substantially constant over this range. However, if the line voltage drops below this normal operating range, the RMS load voltage decreases with the decreasing line voltage so lamp output also decreases. By contrast, FIG. 11 includes a second line showing the lamp output if the conduction angle were kept constant at 57° regardless of the change in line voltage (or if the duty cycle were kept constant in a PWM voltage conversion circuit) as is the case for some prior art lamps.

Figure 12:
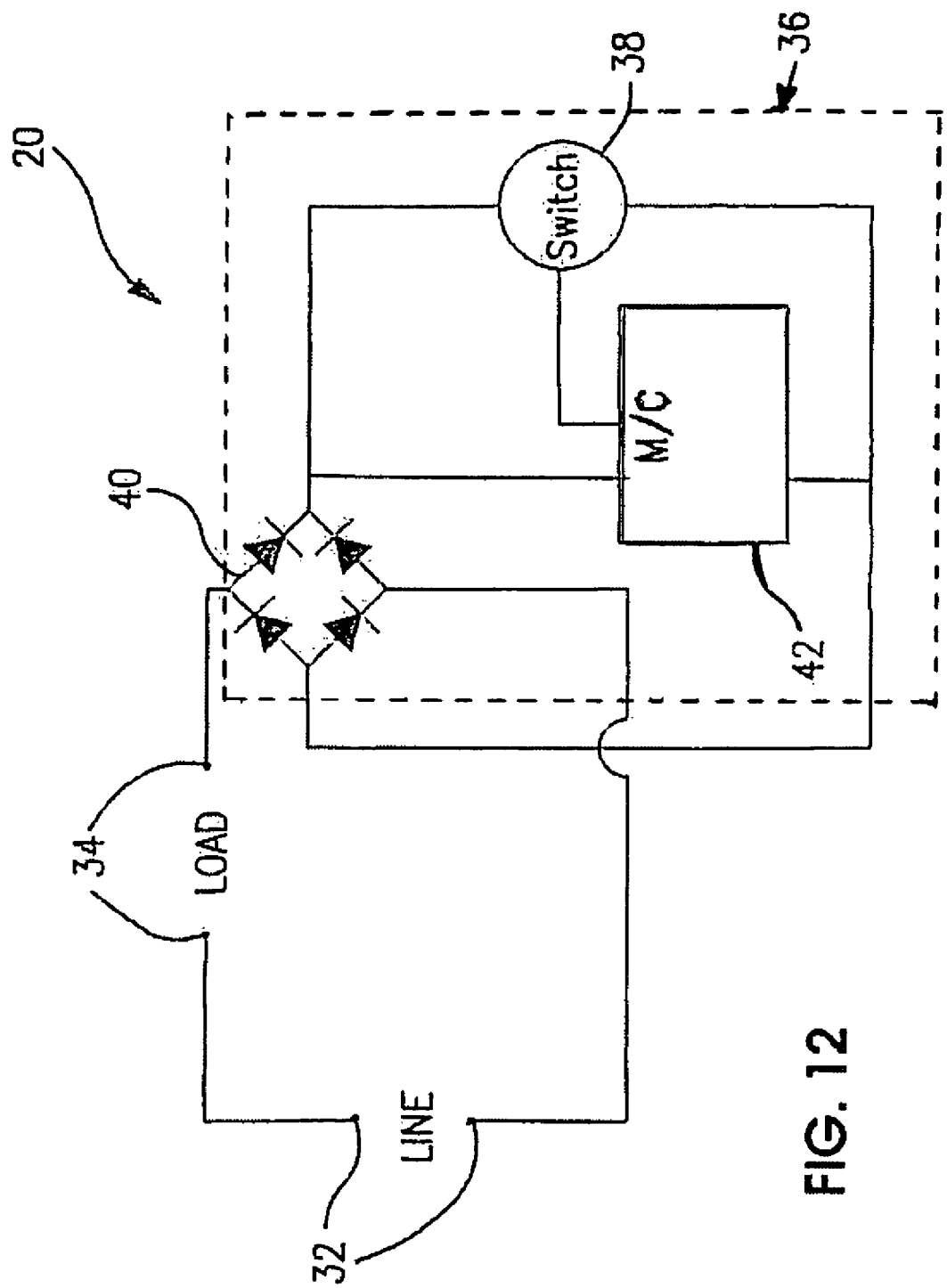
FIG. 12 is a schematic circuit diagram of an embodiment of the voltage conversion circuit of the present invention.

With reference to FIG. 12 that illustrates an embodiment of the present invention, the voltage conversion circuit 20 includes line terminals 32 for a line voltage and load terminals 34 for a load voltage, a control circuit 36 (phase clipping or PWM) that is connected to the line and load terminals and that determines the RMS load voltage. The circuit 36 includes a switch 38 (such as a triac), an (optional) full-wave bridge 40, and a microcontroller 42 that sends signals to the switch 38 that cause the switch to operate during times periods that define the phase conduction angle or switch duty cycle for the circuit 36. The microcontroller 42 is arranged and adapted to sense the load voltage and to compare the sensed load voltage to a reference RMS voltage and to adjust operation of the switch 38 in response to the comparison to cause the RMS load voltage to approach the reference RMS voltage over the normal operating range of the line voltage and to decrease the RMS load voltage as the line voltage decreases in the manner shown in FIG. 10.

Microcontroller 42 preferably includes an analog-to-digital converter (ADC) that converts the load voltage to a digital signal, a comparator that compares the output from the ADC to the reference RMS voltage (or a corresponding reference value), and a program (e.g., in a hardwired and/or programmable circuit) that adjusts the ON time of the switch to adjust the RMS load voltage based on an output from the comparator so as to approach the reference RMS voltage or decrease the RMS load voltage depending on the line voltage. The ADC may be connected to the load voltage through a current limiting resistor. The microcontroller samples the load voltage waveform applied to the lamp and automatically increases or decreases the conduction times such that the RMS load voltage is nearly always at a desired level. The reference RMS voltage is preset to a value that provides the desired RMS load voltage for the lamp. The structure and operation of microcontroller 42 need not be described in detail as such microcontrollers are known in the art and are commercially available from various sources, including Microchip Technology, Inc. under the PIC trademark (e.g., a PIC™ 8-pin 8-bit CMOS microcontroller, such as PIC12F683).

With reference now to FIGS. 13a and 13b, particular embodiments of the voltage conversion circuit of the present invention are shown and their operation and construction will be apparent to those of skill in the art. A full-wave bridge is added to the embodiment of FIG. 13b. The switch may be an insulated gate bipolar transistor or MOSFET, and the microcontroller 48 may be a PIC™ programmable microcontroller that includes an analog-to-digital converter. The microcontroller monitors the voltage on the output line and automatically adjusts operation of the transistor switch such that the RMS load voltage supplied to the lamp filament is constantly at the desired level. Inputs to the microcontroller may be provided by including appropriate circuitry such as the connections, resistors and capacitors in FIGS. 13a and 13b, which are shown by way of example. In the PWM embodiment, the microcontroller desirably is or operated to be astable (not having a stable state at which it can rest). A heat sink (not shown) may be attached to the transistor switch as needed.

While embodiments of the present invention have been described in the foregoing specification and drawings, it is to be understood that the present invention is defined by the following claims when read in light of the specification and drawings.

We claim:

1. A method of converting a line voltage to an RMS load voltage in a lamp, the method comprising the steps of:
    connecting a control circuit to a lamp terminal, the control circuit including a switch and a microcontroller that operates the switch to establish an RMS load voltage for the lamp;
    sensing a load voltage of the lamp;
    comparing, in the microcontroller, the sensed load voltage to a reference RMS voltage; and
    adjusting operation of the switch in response to the comparison so that the RMS load voltage is substantially constant at the reference RMS voltage over a first operating range of the line voltage and adjusting operation of said switch so that the RMS load voltage decreases with decreasing line voltage at non-zero line voltages less than the first operating range, wherein the first operating range of the line voltage is defined to include a predetermined normal line voltage, to have a maximum greater than the predetermined normal line voltage, and to have a minimum less than the predetermined normal line voltage, the minimum being defined as a non-zero line voltage at which a load current is a predetermined maximum.

2. The method of claim 1, wherein the control circuit is a phase-clipping circuit that establishes a phase conduction angle that defines the RMS load voltage and wherein the switch is a transistor switch, and further comprising the step of the microcontroller adjusting ON/OFF periods of the transistor switch to define the phase conduction angle in response to the comparison.

3. The method of claim 1, wherein the control circuit is a pulse width modulation circuit and wherein the microcontroller has a time-based signal source that triggers conduction of the switch to establish a duty cycle of the switch that defines the RMS load voltage, the duty cycle having a frequency substantially higher than a frequency of the line voltage, and further comprising the step of adjusting a timing of signals from the time-based signal source in response to the comparison.

4. The method of claim 1, wherein the microcontroller includes an analog-to-digital converter and further comprising the step of converting a waveform of the sensed load voltage to a digital signal.

* * * * *